(12) United States Patent
DeMent

(10) Patent No.: US 8,282,324 B2
(45) Date of Patent: Oct. 9, 2012

(54) LINER FOR CUSHIONING AND SECURING ROLLED COILS AND OTHER CYLINDRICAL OBJECTS IN A TRANSVERSE TROUGH OF A RAILWAY CAR

(75) Inventor: R. Bruce DeMent, Palos Heights, IL (US)

(73) Assignee: Kastalon, Inc., Alsip, IL (US)

( * ) Notice: Subject to any disclaimer, the term of this patent is extended or adjusted under 35 U.S.C. 154(b) by 156 days.

(21) Appl. No.: 12/897,044

(22) Filed: Oct. 4, 2010

(65) Prior Publication Data

US 2011/0020089 A1    Jan. 27, 2011

Related U.S. Application Data

(62) Division of application No. 11/945,370, filed on Nov. 27, 2007, now Pat. No. 7,815,404.

(51) Int. Cl.
*B60P 7/08* (2006.01)

(52) U.S. Cl. .............. 410/49; 410/47; 410/87; 410/117; 410/155

(58) Field of Classification Search ............ 410/31, 410/32, 36, 39, 40, 42, 47, 48, 49, 50, 86–88, 410/117, 118, 154, 155; 206/389, 417, 446, 206/594; 105/355; 248/633, 687
See application file for complete search history.

(56) References Cited

U.S. PATENT DOCUMENTS 7,815,404 B2 * 10/2010 DeMent .......................... 410/49

\* cited by examiner

*Primary Examiner* — Stephen Gordon

(74) *Attorney, Agent, or Firm* — Much Shelist; Milton Gerstein

(57) ABSTRACT

A liner for a transverse trough of a coil-transport railway car for cushioning a coil and for preventing lateral creep of the load during transport. Each sloping wall of a transverse trough is lined with at least one liner to prevent lateral creep in both transverse directions. Each liner is comprised of a horizontal bottom base or support layer, from which upwardly project a plurality of spaced-apart, flexible fingers or ribs. The fingers or ribs of the liner of the invention may be oriented leftward or rightward in direction of cant, and oriented such as to face or incline toward the centerline of the transport vehicle, and behave or act as leaf springs. When the load of coil is placed onto the liner of the present invention, the fingers thereof serve as the load-bearing surface, and bend or deflect in accordance with the weight of the load, to thereby support the load of coil. In addition, those remaining fingers or ribs not deflected by the load and immediately adjacent to the coil at either end, act as leaf springs to resist any side-to-side, lateral movement of the roll or coil, as would otherwise occur due to vibration and shock imparted during transport.

5 Claims, 5 Drawing Sheets

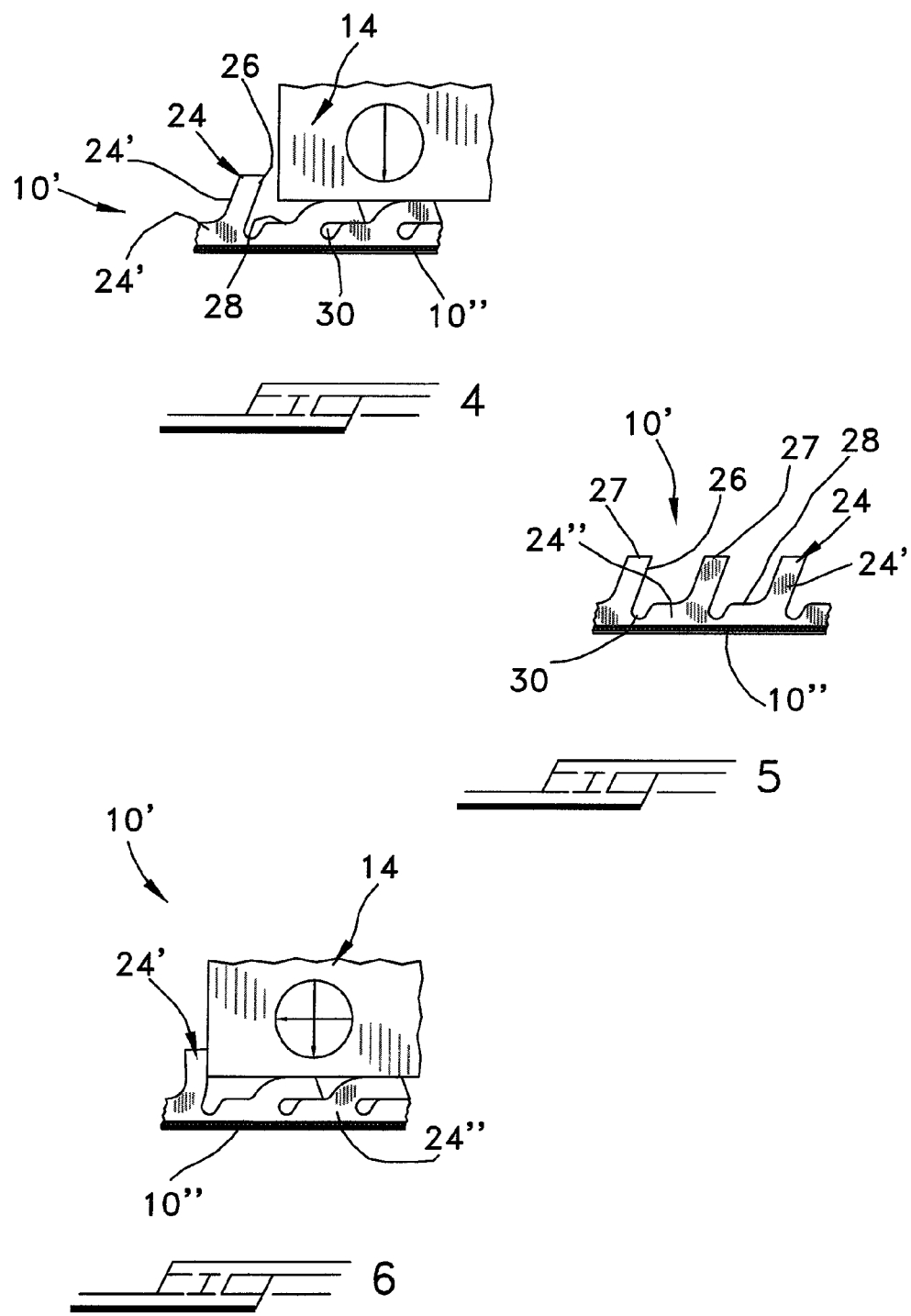

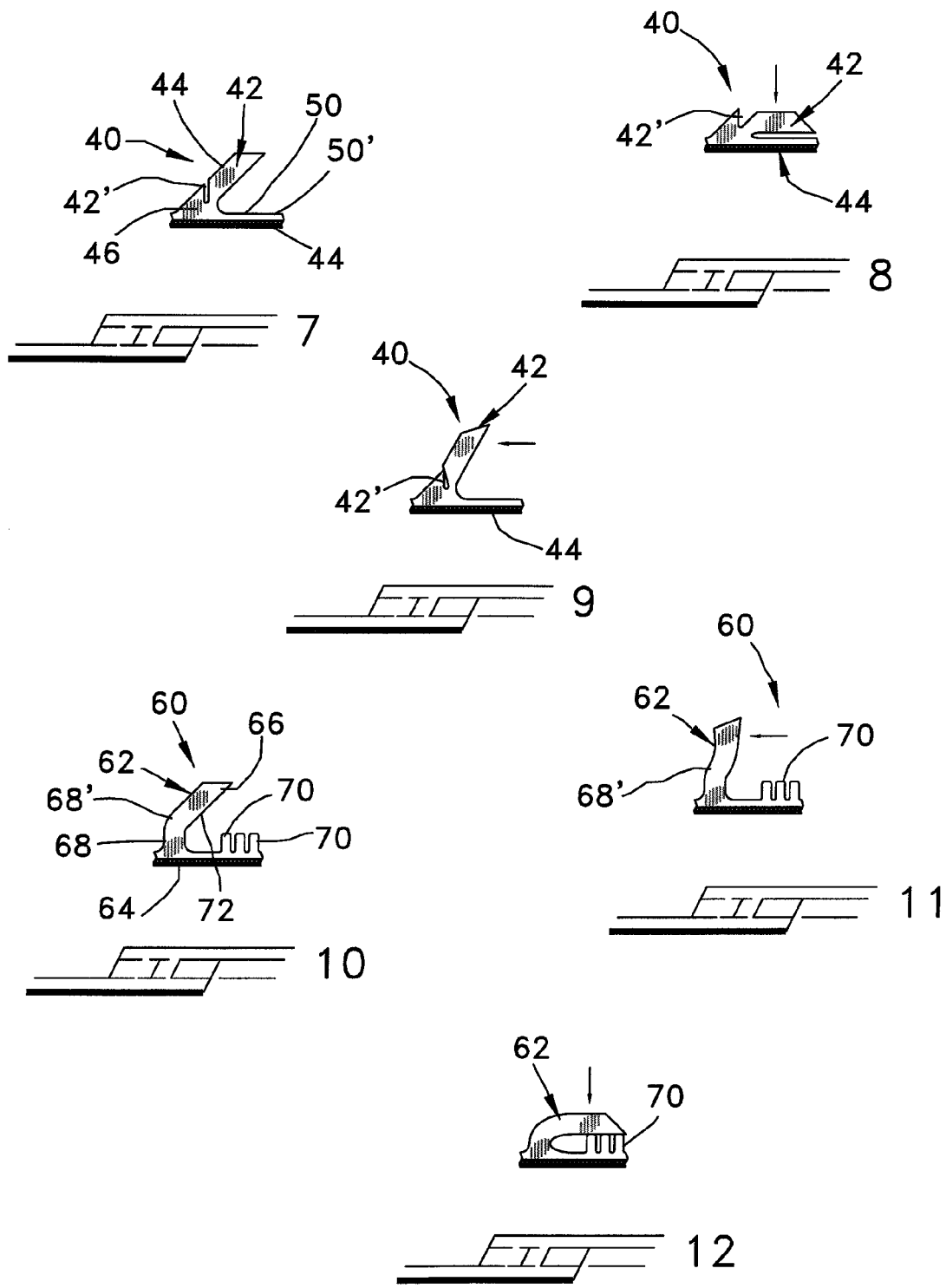

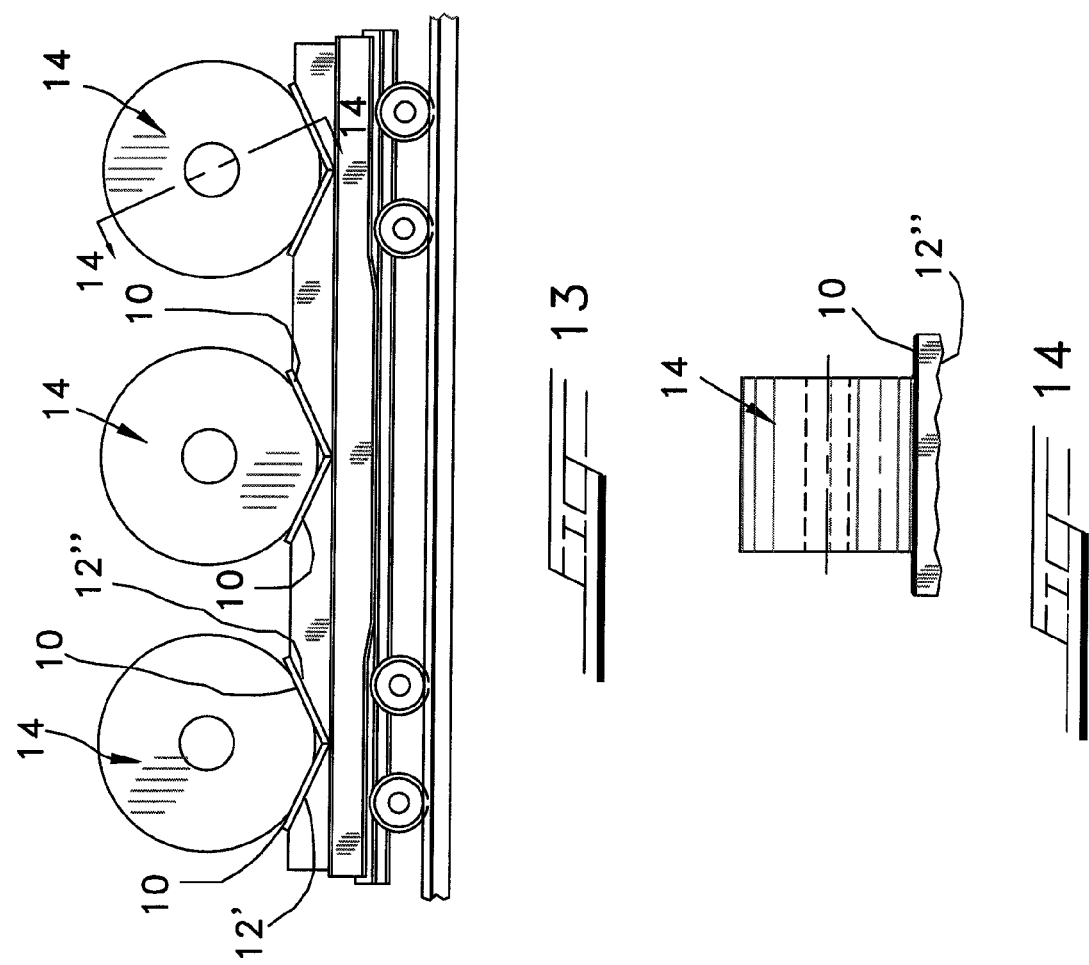

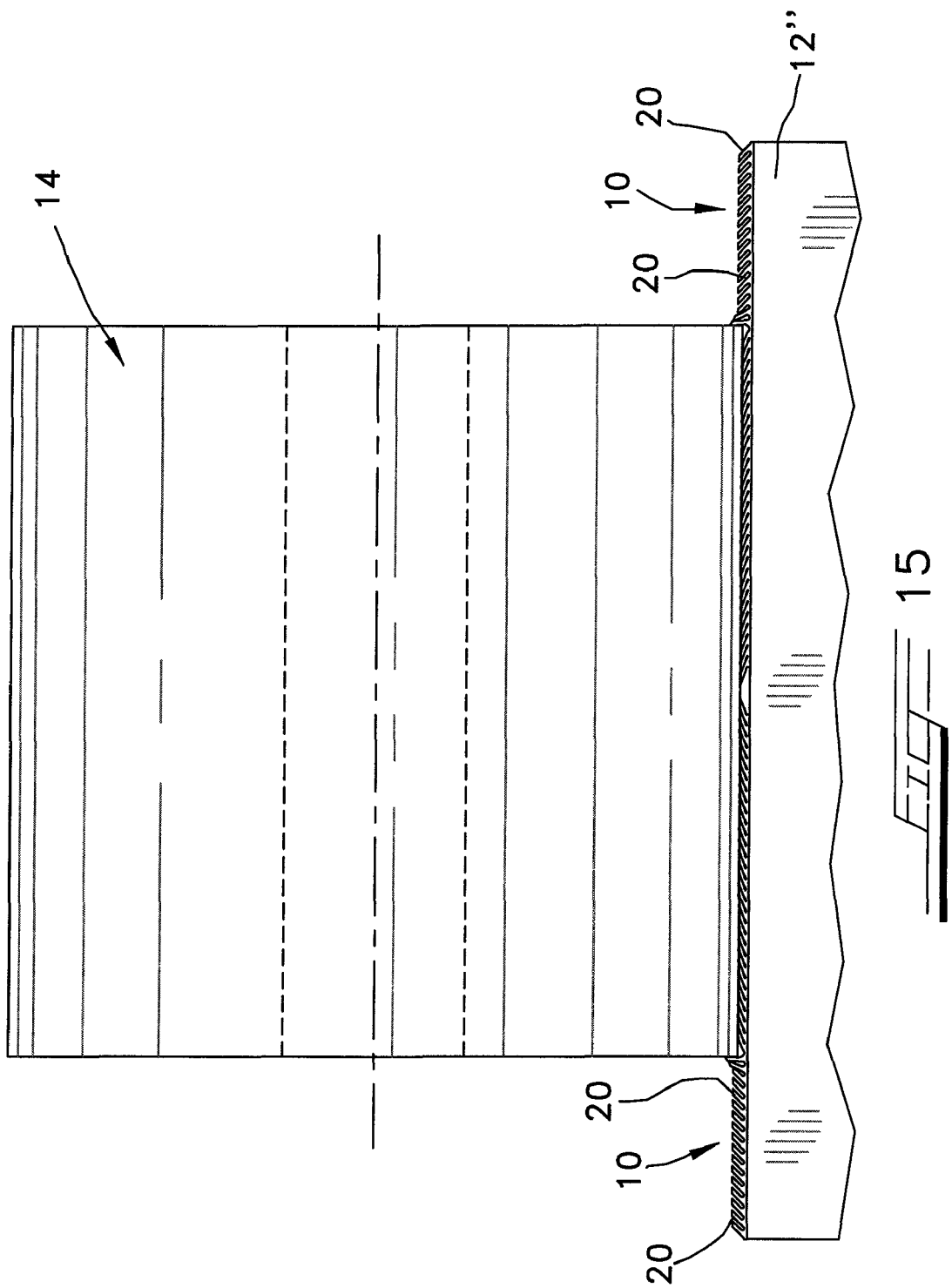

LINER FOR CUSHIONING AND SECURING ROLLED COILS AND OTHER CYLINDRICAL OBJECTS IN A TRANSVERSE TROUGH OF A RAILWAY CAR

CROSS REFERENCE TO RELATED APPLICATION

This is a divisional application of application Ser. No. 11/945,370, filed Nov. 27, 2007 now U.S. Pat. No. 7,815,404.

BACKGROUND OF THE INVENTION

The present invention is directed to a cushioning and securement pad or liner that protects and retains rolled coils of metal, or other material, and other rolled materials and cylindrical objects, during over-the-road transport in a transversely-oriented coil-carrying railroad car, or other transport vehicle.

Many products are manufactured from flat materials that are coiled into large rolls or coils. These coiled products are generally produced a great distance from the end-user's location, and, therefore, must be transported long distances. Often these coiled products are transported via rail, and are subjected to the stresses, shocks and vibrations associated with this mode of transportation. Additionally, these coiled products are often fragile, in that the surface-finishes and desired quality are in their final form, ready and waiting for direct fabrication into parts or end-products. This quality of the coil material is often damaged from the stresses and strains of transport, and must be protected.

The coiled products are typically loaded and placed in troughs or recesses of railway cars, or other similar transport vehicles, utilizing a transverse orientation; that is, the longitudinal axis of the cylindrical-shaped coil is oriented ninety degrees from the longitudinal axis, or center line, of the transport vehicle and parallel to the wheel axles. This type of loading scheme allows for more efficient loading of the coils than does in-line, or longitudinal, loading. However, during transport, the vibrations and shocks encountered may cause the transported cylindrical objects to "walk" or migrate within the trough, or move from side to side, or to collect on one side of the transport vehicle. Owing to the fact that the loaded coils are very heavy, such can cause the transport vehicle to become unbalanced and, in some cases, tip to one side. In some cases, this tipping of the transport vehicle may become dangerous and lead to the vehicle's tipping over and causing an accident.

Many and variegated prior-art techniques and methods have been attempted to address the above-mentioned problems. Included among these are lining the troughs with conveyor belt, wood, and various rubber or plastic surfaces or shapes in order to protect, prevent and limit movement of the coiled products from their loaded positions. However, none of these prior-art options has proven to be safe and effective. Currently-used methods retain the loaded cylindrical objects or coils in position with loose dunnage that is placed in, and occupy the majority of, the vacant space in the transverse trough of the railway car, or other transport vehicle. Due to the variability of load-sizes and the sometime lack of availability of dunnage material, this prior-art method is not a desirable solution for the securement of these loads.

The liner of the present invention solves all of the above-mentioned drawbacks and insufficiencies of the prior-art methods, and resists the movement of the coils or other cylindrical objects during transport, as well as cushioning them, thus maintaining the original loaded position thereof and preserving the loaded balance of the vehicle during transport.

SUMMARY OF THE INVENTION

It is the primary objective of the present invention to provide a liner for use in a transverse coil-mounting trough of a railway car, or other transport vehicle, that maintains during transport the position of coils, rolls and other cylindrical objects when loaded onto the transversely-oriented troughs.

It is also a primary objective of the present invention to provide such a liner that cushions and retains in place in the trough, the coils, rolls, and other cylindrical objects during transport, and minimizes damage to the load during transport from shock and vibration.

In accordance with the present invention, the liner of the invention is comprised of a horizontal bottom base or support layer from which upwardly project a plurality of spaced-apart, flexible fingers or ribs that are canted at an angle from between 15 degrees to 90 degrees with respect to the horizontal. The fingers or ribs together with the base layer are unitized or arranged into an assembly, or a molded into a unit, that is mechanically or chemically fastened to the interior load surfaces of a transverse trough of a railway coil car, or similarly configured conveyance for cylindrical objects. The fingers or ribs of the liner of the invention may be oriented leftward or rightward in direction of cant, and oriented such as to face or incline toward the centerline of the transport vehicle, and behave or act as leaf springs. When the load of coil is placed onto the liner of the present invention, the fingers thereof serve as the load-bearing surface, and bend or deflect in accordance with the weight of the load, to thereby support the load of coil. The resistance to bending of the fingers provides cushioning to the coil, and offers a "live" suspension system for the load. This "live" suspension may originate either from a partial deflection of spring fingers, or, when the fingers are made from a flexible conformable material, such as polyurethane, the material itself with the fingers fully deflected will offer a spring action and protection from shock and vibration. In addition, those remaining fingers or ribs not deflected by the load and immediately adjacent to the coil at either end, act as leaf springs to resist any side-to-side, lateral movement of the roll or coil, as would otherwise occur due to vibration and shock imparted during transport. The return-biasing resistance or force imparted by the bending of the finger of the liner of the invention is generally sufficient to overcome the force imparted by shock and vibration during transport, thus maintaining the centerline-positioning of the coil, roll, or other cylindrical object, in the trough. In a preferred embodiment, the material and structure of the fingers impart an ever-increasing resistance or return-biasing force to movement when a greater degree of deflection is experienced. Also, in a preferred embodiment of the invention, the fingers or ribs are close enough in proximity to each other such that, if the initially contacted rib or finger is sufficiently deflected, such will contact the adjacent rib or finger, which adjacent rib or finger will also resist the horizontal force tending to cause transverse movement of the coils, thus providing additional and increased resistance when increased horizontal force is applied. The base layer of the liner material to which the bottom ends of the ribs are attached is preferably reinforced, such base layer being a composite structure utilizing a reinforcing material, such as woven or non-woven carbon, glass or other fiber that are incorporated into the base structure of the liner which will eliminate stretch or movement of the liner under load. Additionally, this composite construction provides structure facilitating the attachment of the liner to the vehicle, such as chemically, adhesively or by use of mechanical fasteners.

BRIEF DESCRIPTION OF THE DRAWING

The invention will be more readily understood with reference to the accompanying drawing, therein:

FIG. 4 is a partial side plan view of a second embodiment of the trough-liner of the invention depicting a coil or other rolled object supported thereon for cushioning and for maintaining the coil from sideways creep;

FIG. 5 is a partial side plan view of the second embodiment of the trough-liner of the invention in its natural, unloaded state without a coil or other rolled object supported thereon;

FIG. 6 is partial side plan view of the second embodiment of the trough-liner of the invention depicting a coil or other rolled object supported which coil or other rolled object has begun to creep to one lateral side during transport, with the slanted flexible ribs of the trough-liner of the invention preventing the coil from any undue and excessive sideways creep;

FIG. 7 is a partial side plan view of a third embodiment of the invention shown in an unloaded condition, and in which the flexible ribs are spaced farther apart with each rib being provided with a vertical cut or groove formed therein to increase flexibility;

FIG. 8 is a partial side plan view of the third embodiment of the invention shown in a loaded condition, in which the flexible rib is forced horizontally by the load;

FIG. 9 is a partial side plan view of the third embodiment of the invention shown in a loaded condition, in which a flexible rib thereof is forced backwardly in order to resist lateral creeping or walking of the load thereon;

FIG. 10 is a partial side plan view of a fourth embodiment of the invention shown in an unloaded condition, and in which the flexible ribs are spaced apart and which is provided with a series of vertically upstanding stops, where one vertically-oriented stop is located between a pair of flexible ribs;

FIG. 11 is a partial side plan view of the fourth embodiment of the invention shown in a loaded condition, and in which a flexible rib thereof is forced backwardly in order to resist lateral creeping or walking of the load thereon;

FIG. 12 is a partial side plan view of the fourth embodiment of the invention shown in a loaded condition, in which a flexible rib is forced horizontally by the load for contact of the rib against a vertically upstanding stop;

FIG. 13 is a side plan view of a railway car incorporating the trough liners of the invention in its plurality of troughs;

FIG. 14 is a cross-sectional view taken along line 14-14 of FIG. 13; and FIG. 15 is an enlarged view of FIG. 14 showing the use of two liners for each sloping side wall of each transverse trough so that resistance to lateral movement of a load is provided.

DETAILED DESCRIPTION OF THE INVENTION

Figure 1:
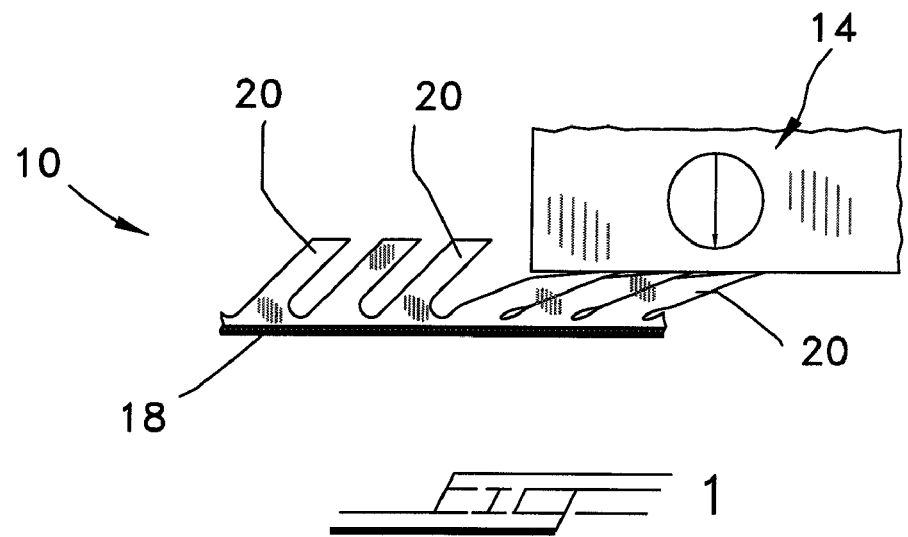
FIG. 1 is a partial side plan view of a first embodiment of the trough-liner of the invention depicting a coil or other rolled object supported thereon for cushioning and for maintaining the coil from sideways creep.
Figure 2:
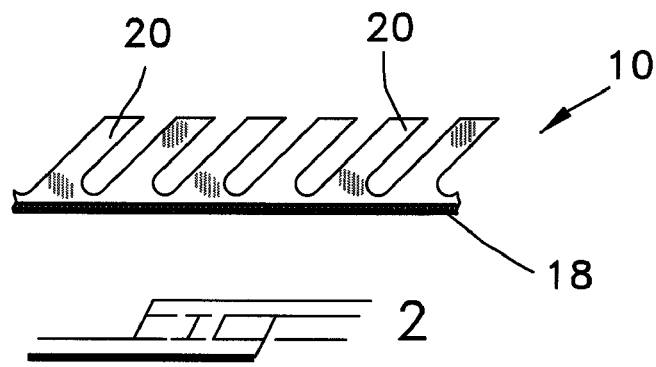
FIG. 2 is a partial side plan view of the first embodiment of the trough-liner of the invention in its natural, unloaded state without a coil or other rolled object supported thereon.
Figure 3:
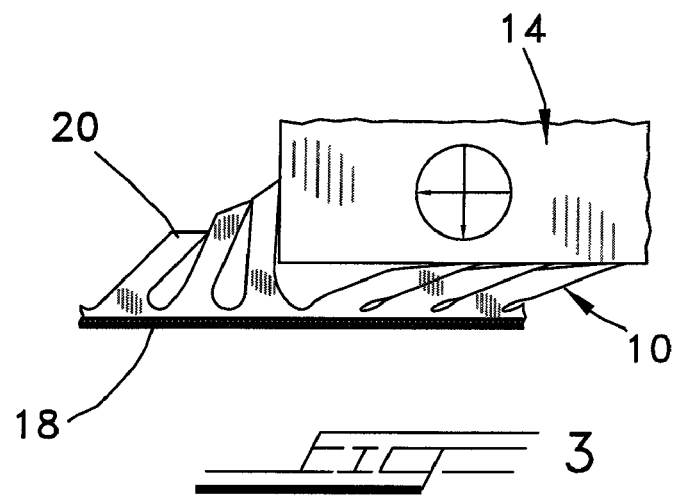
FIG. 3 is a partial side plan view of the first embodiment of the trough-liner of the invention depicting a coil or other rolled object supported which coil or other rolled object has begun to creep to one lateral side during transport, with the slanted flexible ribs of the trough-liner of the invention preventing the coil from any undue and excessive sideways creep.

Referring now to the drawings in greater detail, there is shown in FIGS. 1-3 a first embodiment of the trough-liner 10 for use in cushioning and maintaining coils and rolled objects in a transverse trough of a railway car or other transport vehicle in accordance with the invention. Each liner 10 lines half of the length of a sloping wall of a trough 12 located in a railway-car interior, which trough may extend substantially along the entire lateral width of the railway car for holding and retaining a coil, roll, or other cylindrical object, such as rolled steel coil 14, in a manner as seen in FIG. 13. There are provided many such transverse troughs arranged in parallel in the railway car from the front thereof toward the rear thereof, where each trough supports one coil or roll in the middle or center thereof, approximately midway between the sill side walls of the railway car. Each of the transverse troughs 12 (FIG. 13) is oriented in the interior of the transverse-coil railway car such that it supports and retains a coil in a transverse position where the rotary axis of the coil is parallel to the axles of the railway car and transverse to the center-line or longitudinal axis of the railway car. The trough is typically of sufficient depth in order to prevent the coil from forwardly or rearwardly rolling out of the trough due to inertia during deceleration and acceleration. However, torques and vibrations generated during transport tend to cause the coils to "walk" or creep away from the centerline of the railway car and centerline of the trough in either of the two transverse directions perpendicular to the direction of travel of the railway car. In order to prevent this sideways or lateral walking or creeping of the coil within the trough, the trough-liners 10 of the present invention are employed, which trough-liners of the invention not only inherently provide cushioning of the coil in the trough, but also inherently prevent sideways movement of the coil within the trough away from the centerline of the trough, in the manner described hereinbelow. Each trough 12 is provided with four such liners 10 of the invention, two for each of the sloping walls 12', 12" of the transverse trough as described hereinbelow in greater detail.

The trough liners 10 provide cushioning to a coil-load and preferably are made of a spring steel, flexible plastic, elastomer such as rubber, polyurethane, thermoplastic elastomer (TPE), thermoplastic rubber (TPR), thermoplastic polyurethane (TPU), or the like, preferably in the hardness range of between 40 Shore A through 75 Shore D, although different hardness ranges are contemplated. Each trough liner 10 consists of a base or mounting layer 18 that is reinforced with a composite structure of woven or nonwoven carbon, glass, or other fibers, which eliminates stretch and movement of the liner in the trough under load conditions. Therefore, base layer 18 is an inflexible composite structure resisting horizontal stretching or displacement thereof and thus the trough liner itself, and provides integrity for the position of the flexible ribs 18 as described hereinbelow. The base layer may be adhered to a wall of a transverse trough of a transverse-coil railway car by using a chemical adhesive, which adhesives would vary dependant on the composition of the primary material and the composite base material, such being apparent to one of ordinary skill in the art. However, the preferred embodiment is to encapsulate the base layer by "casting" or molding the base layer into the primary material of which the flexible ribs are made, which primary material permeates into the composite material. The composite material may be treated with wetting agents, adhesion promoters, other materials or treatments such as high energy corona treatment, and the like, to facilitate adhesion and the permeation of the composite base material by the primary material, as would be obvious to one of ordinary skill in the art. Of course, other conventional methods may be used for bonding or affixing the liner to a trough-wall.

Projecting upwardly from the base layer 18 are a series of flexible ribs or fingers 20, which under load-conditions flex or bend downwardly as shown in FIG. 1. While just a few such flexible ribs have been shown, it is to be understand that as many as required are provided in accordance with the size of the load being supported and transported, as seen in FIG. 15. Each rib element 20 projects at an angle with respect to the base layer of between 15 and 90 degrees depending upon the anticipated required resistance to creep of the coil in the trough. For an anticipated least-expected creep, the angle of the ribs with respect to the base layer may be closer to 15 degrees. As can be seen in FIG. 1, under load conditions, the coil 14 rests upon some of the angled ribs 20, which loaded ribs are deflected downwardly to thereby cushion the load. If, during transport, the coil is caused to move or walk laterally, the unloaded ribs adjacent the loaded ribs prevent this walk or creep by contacting against the side face of the coil, as seen in FIG. 1. Since these unloaded ribs are sloping, when the coil abuts against the first unloaded rib during creep, the unloaded rib is forced to straighten up, which thereby causes the unloaded finger to provide an ever-increasing counter-biasing force to the walk or creep of the coil. This counter-biasing force is further increased or enhanced by contact of the thus-straightened first unloaded rib against its immediately-adjacent second rib that is also unloaded, whereby the coil must overcome the combined counter-biasing forces of the first and second unloaded ribs. Even if the forces causing creep were enough to overcome the counter-biasing forces of the first and second unloaded ribs, further creep would cause the coil to cause the second unloaded rib to abut against the immediately-adjacent third unloaded rib, whereby the additional counter-biasing force to the creep is provided as shown in FIG. 3. Thus, the flexible ribs 20 resist lateral movement of the load with increasing resistance with increasing displacement by the counter-biasing thereof during the reverse bending and deflection caused by the coil-creep.

The flexible fingers or ribs 20 may be either left-oriented or right-oriented. In FIGS. 1-3, the ribs are shown as right-oriented, meaning they slope toward the right when viewing FIG. 2. What is important is that the flexible ribs or fingers 20 slope such that when each liner 10 is in use and mounted to a wall 12', 12" of a trough 12 (FIG. 13), they slope toward the centerline of the railway car and away from the transverse side walls or side sills of the railway car, in order that the ribs bias the coil back toward the center of the railway car and away from the laterals sides, as shown in FIG. 3. Thus, the very same liner 10 shown in FIG. 2 that is shown as right-oriented, if rotated 180 degrees, will provide a liner with ribs that are left-oriented. Thus, depending upon which side of the centerline of the trough the liner is affixed, the liner 10 is so oriented such that each liner biases the coil toward the center of the railway car and away from the side sills when sideways creep of the coil occurs during transport. As can be seen in FIG. 15, each wall 12', 12" of a trough 12 is lined with two liners 10 of the invention, whereby a total of four liners 10 are used for each trough. Thus, there are two liners 10 affixed to each of the walls 12',12". One liner 10, of the two affixed to the same respective side wall 12' or 12" of the trough on one lateral side of the centerline of the railway car and trough is right-oriented, while the other liner 10 affixed to the same respective side wall 12', 12" on the other lateral side of the centerline is left-oriented, in order that all of the ribs or fingers 20 of the both liners 10 face or slope toward the centerline of the railway car and trough. This ensures that, regardless of the direction of transverse creep of the coil, the liners 10 will provide the necessary biasing force toward the centerline of the railway car in order to restore the coil to its centered, neutral position, while all liners 10 continue to provide proper and necessary cushioning of the load during transport.

In another embodiment where cushioning is not critical for the protection of the load during transport and the resistive force required to counteract transverse creep is not as great, only one side or surface of the trough may be lined. Thus, there be utilized two liners installed on just one wall of the trough with the ribs oriented left and right toward the center as described above.

Referring now to FIGS. 4-6, there is shown a second embodiment 10' of the trough liner of the invention. The trough liner 10' has a base layer 10" similar to the base layer 18 of the liner 10 of the first embodiment of FIGS. 1-3, and provides the structural integrity to the liner 10' as well as securing the liner to the wall of the trough, as described hereinabove. The trough liner 10' is provided with a series of flexible ribs or rib members 24, each of which defines a first, flexible angled section 24' and a second, horizontal stationary mounting section 24" from which projects the first, flexible angled section 24'. While just a few such flexible rib members have been shown, it is to be understand that many are provided in accordance with the size of the load being supported and transported. The second, stationary section is formed integrally with the base layer 10', in the manner described hereinabove with regard to the first embodiment. The first, flexible angled section 24' flexes in a vertical plane as compared with the horizontal stationary mounting section 24", so that when a coil-load is placed thereon, the angled sections 24' flex downwardly, as seen in FIGS. 4 and 6, until the under-surface 26 of the flexed angled section abuts against the upper horizontal surface 28 of the second, horizontal stationary mounting section 24" of the immediately adjacent to the flexed angled section 24', in order that the load be adequately cushioned during transport. In order to increase the flexibility of each flexible angled section 24', each horizontal stationary mounting section 24" is provided with a reduced-thickness portion 30 immediately adjacent to a flexible angled section 24' of the immediately preceding flexible rib 24, as seen in FIGS. 4-6. In this embodiment, owing to increased return-biasing forces, when the load tends to creep laterally during transport, the load need only contact against one unflexed angled section 24' in order to prevent lateral creep of the load toward the sides of the railway, as seen in FIG. 6. This increased biasing force arises from the fact the associated horizontal stationary mounting section 24" is relatively thick, thus causing increased resistance and stiffness to the reverse bending of its associated angled section 24'. Thus, the forward flexing of the angled sections 24' provide the necessary cushioning and support of the load thereon, while the reverse flexing thereof provides ever-increasing resistance to creep or walk of the load therealong. The trough liner and associated parts are made of the same material as described above with reference to the first embodiment of FIGS. 1-3.

In one version of the second embodiment of FIGS. 4-6, in an unloaded state, the thickness of the elastomeric first, flexible angled section 24' may be between $3/32$-$3/4$ of an inch, while the spacing between adjacent first, flexible angled section 24' is between $1/4$-4 inches. In addition, the vertical distance from the upper horizontal surface 28 of the second, horizontal stationary mounting section 24" to the upper horizontal surface 27 of the first, flexible angled section 24' is between ¼-4 inches. The angle formed by the sloping flexible angled section 24' with the respect to the horizontal surface 28 may be between 45-90 degrees. All of these dimensions are given only by way of example, and are not meant to be limiting in any manner.

Referring now to FIGS. 7-9, there is shown a third embodiment 40 of the trough liner of the invention. For purposes of clarity, only one flexible rib 42 is shown and depicted, it being understood that the trough liner 40 is provided with many such flexible ribs 42. The trough liner 40, in addition to a series of flexile ribs 42, also has a base layer 44, similar to the base layers 18 and 10" of the first and second embodiments, respectively, and is made of the same material and of the same structure, as described hereinabove. Each flexible rib element or member 42 is similar to the flexible rib elements or members 20 of the first embodiment, except that each rib 42 of the third embodiment is provided with vertical slot or notch 42' formed therein, which divides the rib 42 into a first, inward-facing portion 44 and a second outward-facing portion 46. The ribs 42 are forced downwardly against the upper surface 50' of the horizontal section 50 of the trough liner from which project the flexible ribs 42. When a load is placed on a rib 42, it is flexed downwardly against a portion of the upper surface 50', as seen in FIG. 8, which upper surface serves as a limit stop to further movement thereof, whereby the load is cushioned and supported on a plurality of ribs 42 during transport. The ease of flexing each rib 42 is enhanced by use of the vertical slots 42. However, these very same slots of grooves 42 also provide increased resistance or counter-torque when the rib 42 is reverse biased when the load experiences lateral creep during transport, since the inward-facing portion 44 abuts against the stiffened, thick outward-facing portion 46, as shown in FIG. 9, in the manner similar to that described above with respect the second embodiment of FIGS. 4-6, whereby creep or walk of the load is prevented.

Referring now to FIGS. 10-12, there is shown a fourth embodiment 60 of the trough liner of the invention. For purposes of clarity, only one angled flexible rib 62 is shown and depicted, it being understood that the trough liner 60 is provided with many such flexible ribs 62. The trough liner 60, in addition to a series of flexile ribs 62, also has a base layer 64, similar to the base layers 18, 10" and 44 of the first, second and third embodiments, respectively, and is made of the same material and of the same structure, as described hereinabove. Each flexible rib 62 consists of an upper angled flexible rib portion 66 which projects upwardly at an acute angle from lower vertical stiffened portion 68. The lower portion 68 transitions into the upper angled flexible rib portion at the upper end of the lower portion via a thickened upper curved portion 68', which provides stiffening to the reverse flexing of the upper flexible rib portion 66, when the load experiences lateral creep during transport, as shown in FIG. 11, in the manner similar to that described above with respect the second and third embodiments of FIGS. 4-6, and 5-7, respectively, whereby creep or walk of the load is prevented during transport.

The upper flexible rib portion 66 of each rib flexible rib 62 is pivoted downwardly, when viewing FIG. 10, until contacting a plurality upstanding, stationary stop-elements 70 projecting upwardly from the upper surface of the base layer 64. Each flexible rib portion, when fully loaded by a coil, is flexed until contact of the undersurface thereof 72 abuts against the upper ends of the plurality of stop-elements 70, upon which the flexible rib portion 66 assumes a horizontal position or orientation, when viewing in FIG. 12, in order to prevent excessive bending of the upper flexible rib portion 66 during load-conditions, in order to prevent excessive strain thereon which might lead fatigue, and also in order that each flexible rib portion 66 supports the load in a plane substantially parallel to the trough wall surface. It is noted that a series of three or more stop-elements 70 are provided forward of each upper flexible rib 62 along the length of the liner 60. The stop-elements offer lower compressive resistance, whereby greater cushioning of the load is provided if needed.

While specific embodiments of the invention have been shown and described, it is to be understood that numerous changes and modifications thereof may be made without departing from the scope and spirit of the invention, as set forth in the appended claims.

What is claimed:

1. A method of preventing lateral movement of a coil, roll, or other cylindrical object, loaded in transverse trough of a transport vehicle, which transverse trough has a pair of sloping side walls for supporting a load, with said transport vehicle having a longitudinal centerline, said method comprising:
   (a) lining each said sloping side wall with a liner that resists lateral creep of a load placed in the transverse trough;
   (b) said step (a) comprising lining each said sloping side wall with at least one liner having a plurality of flexible rib elements that are capable of flexing in a direction toward the centerline of the transport vehicle for cushioning a load placed thereon, and for resistant bending in the reverse direction away from the centerline of the transport vehicle for resisting lateral movement of a load supported thereby, whereby lateral creep of the load toward either of two sides of the transport vehicle is arrested.

2. The method of preventing lateral movement of a coil, roll, or other cylindrical object, loaded in transverse trough of a transport vehicle, according to claim 1, wherein said step (b) comprises lining each sloping side wall with at least one liner having a series of rib elements that when flexed by a load thereon rotate in a direction of the centerline of the transport vehicle when the at least one liner is mounted to a respective one of said side walls.

3. The method of preventing lateral movement of a coil, roll, or other cylindrical object, loaded in transverse trough of a transport vehicle, according to claim 2, wherein said step (b) comprises lining each sloping side wall with two said liners, one said liner being approximately located on one lateral side of the centerline of the transverse vehicle, and the other said liner being approximately on the other lateral side of the centerline of the transverse vehicle; said one liner being oriented oppositely to said other liner so that each said flexible rib element of each of said one liner and said other liner flexes toward the centerline of the transport vehicle when supporting a load thereon, and is resistively deflected rearwardly when not supporting a load thereon and impinged thereagainst by a load supported by other said flexible rib elements to resist movement of the load thereby during lateral creep of the load during transport.

4. The method of preventing lateral movement of a coil, roll, or other cylindrical object, loaded in transverse trough of a transport vehicle, according to claim 3, wherein said step (b) further comprises additionally resisting lateral creep of a load by abutting contact of an already-rearwardly deflected rib element against another immediately-adjacent unloaded rib element for causing said another immediately-adjacent unloaded rib element to also resistively deflect rearwardly.

5. The method of preventing lateral movement of a coil, roll, or other cylindrical object, loaded in transverse trough of a transport vehicle, according to claim 1, wherein said step (b)

further comprises additionally resisting lateral creep of a load by abutting contact of an already-rearwardly deflected rib element against another immediately-adjacent unloaded rib element for causing said another immediately-adjacent unloaded rib element to also resistively deflect rearwardly.

\* \* \* \* \*